No. 835,005. PATENTED NOV. 6, 1906.
A. S. ALLEN.
WHEEL TIRE.
APPLICATION FILED MAR. 6, 1905.
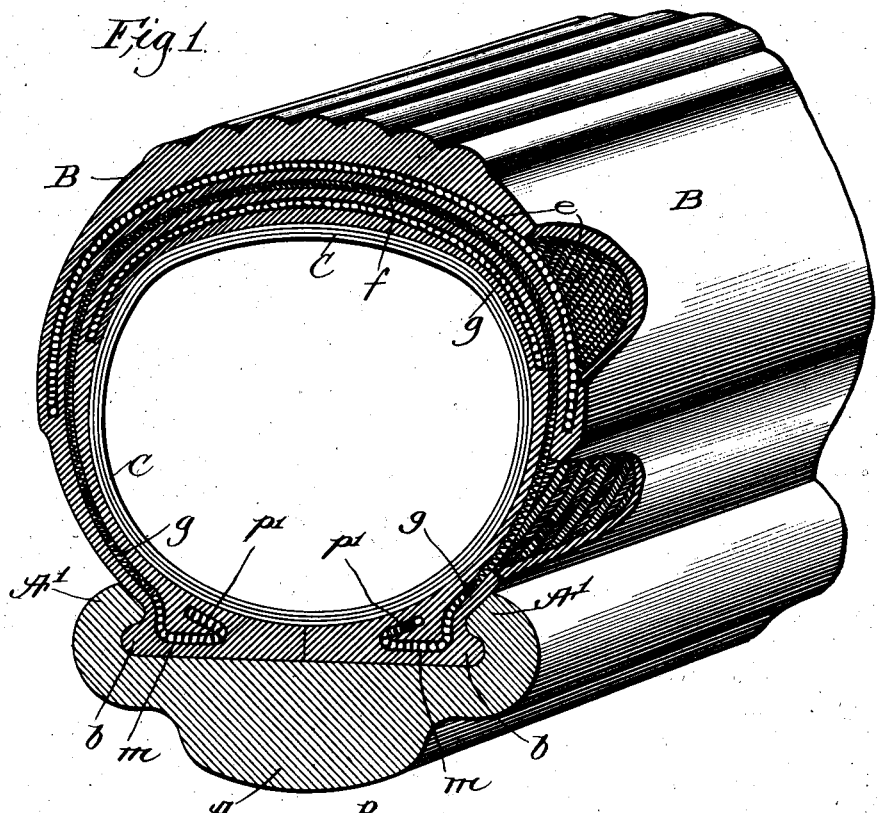
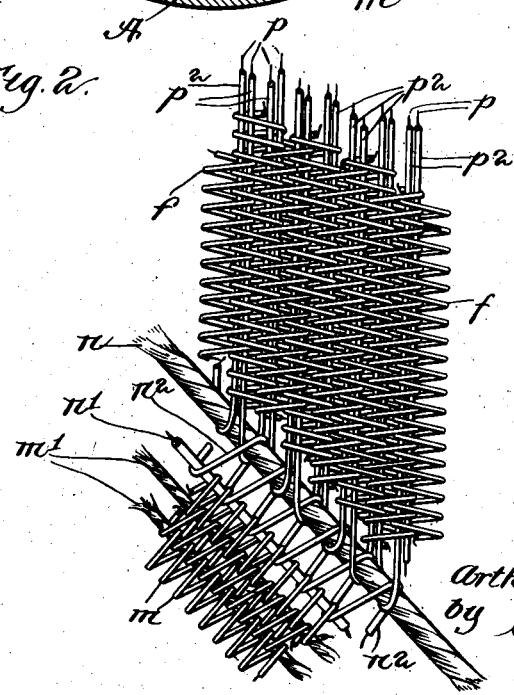
Witnesses
W. C. Lunsford
A. W. Knapp
Inventor
Arthur S. Allen,
by Crosby Gregory
Atty's

UNITED STATES PATENT OFFICE.

ARTHUR S. ALLEN, OF BROOKLINE, MASSACHUSETTS.

WHEEL-TIRE.

No. 835,005.

Specification of Letters Patent.

Patented Nov. 6, 1906.

Application filed March 6, 1905. Serial No. 248,466.

*To all whom it may concern:*

Be it known that I, ARTHUR S. ALLEN, a citizen of the United States, and a resident of Brookline, in the county of Norfolk and State of Massachusetts, have invented an Improvement in Wheel-Tires, of which the following description, in connection with the accompanying drawings, is a specification, like letters on the drawings representing like parts.

This invention relates to wheel-tires of india-rubber or similar yielding material, and has for its object to provide the same with a puncture-proof armor.

The invention to be described is illustrated as an improvement on that described in my previous application for Letters Patent of the United States, Serial No. 232,412, filed November 12, 1904. The tire shown in said application contains a series of intermeshed wire coils crossing the tire, and the ends of some of the wire coils are carried into the india-rubber, acted upon by the rim of the wheel or that part of the tire with which coacts whatever is used to retain the tire on the rim.

Herein I have extended longitudinally of the tire, along that part thereof at or about the rim, a series of intermeshed edge coils that extend circumferentially about the rim. One longitudinal coil of the series of edge coils is provided with a cord that is embraced by stay-cords extended longitudinally through and locking together the intermeshed coils that cross the tire.

I believe that I am the first to combine with an armor of any sort embedded in the body of the tire a series of intermeshed edge coils surrounding the rim, whether the armor be, as I prefer, composed of intermeshed wire coils or other armor composed of wire or metal. I also believe that I am the first to use in a tire wire covered with textile material, so that the india-rubber applied to the tire will cling more closely to the armor used in the tire.

Figure 1, in perspective, shows part of a wheel-rim and a section of tire provided with intermeshed wire coils in accordance with my invention, portions of the tire being broken out to show the trend of the different layers of wire coils. Fig. 2 is a detail showing some of the intermeshed wire coils that cross the tire connected with the edge coils that surround the rim.

The rim A, having lips A' to be engaged by the hooked edges $b$ of the tire B, and the inner inflatable tube C are and may be all as usual, the particular shape of the tire in cross-section and the particular manner of attaching the tire to the wheel-rim not being essential, and instead of holding the tire in place by the hooked edges of the rim I may employ any other usual holding means by which to retain the tire on the rim.

The series of intermeshed wire coils $e\,f\,g$, formed of wires twisted, preferably, right and left, laid side by side, and intermeshed one with the other by shoving the side of one coil into the side of the other by lateral movement of one coil with relation to the other, are and may be the same as fully described in my said application, Serial No. 232,412. Herein in addition to the intermeshed wire coils I employ a series of coils $m$, that are extended about the rim and are united by means of a connection $n$, shown as a strong cord. In Fig. 2 are represented but three wire coils $m$, intermeshed by shoving the side of one coil into the other. Each pair of wire coils when intermeshed is united by a strand $m'$, and the wire coil next the connection $n$ receives through it a wire $n'$. The intermeshed coils $f$, that cross the tire for more or less of its length, are united by a strand $p$, the same strand being extended through one after the other of the intermeshed coils, and, viewing Fig. 2, it will be seen that the strand $p$ is passed around the connection $n$ after its withdrawal from one pair of intermeshed coils and before it is passed through the next pair of intermeshed coils, it being understood that the wire fabric represented by the intermeshed coils $f$ is built up and made of greater or less length by uniting one coil with another or side by side by a strand $p$. The connection $n$ is united with the wire $n'$ by a binder $n^2$, which embraces the connection and also the wire. In this way it will be seen that the armor composed of wire coils that enter into the india-rubber forming the body of the tire is composed of two series of wire coils, one extending crosswise of the tire and the other running lengthwise of the tire.

This invention is not limited to the particular length of the coils crossing the tire, but preferably they will run substantially into the thickened part of the tire edge that is to be engaged by whatever means is to be employed to confine the tire to the rim, nor is the invention confined to the particular number of edge coils employed. It will be understood that the edge of the coils may be bent freely in the thickened edge of the tire, or that part which contacts with the rim, and may be laid in any position readily without any liability of the outermost coil being exposed. For instance, in Fig. 1 some of the series of edge coils are bent backwardly, as represented at $p'$. The interstices of these wire coils, intermeshed and locked together as described, receive a filling, preferably of india-rubber or equivalent material, that may be vulcanized after being applied to the interstices of the wire coils. This filling may be applied either before the wire coils are laid into the india-rubber to form the body of the tire or the interstices may receive the filling during the manufacture of the tire on the usual former, it being understood that the body of the tire may be produced by usual means understood by workers in india-rubber and in the usual way.

Adding the edge coils to the transverse coils forms a finish for the armor and makes it possible to form more easily the head at the base of the tire.

The invention herein described is applicable not only to tires, but also to so-called "treads," which are adapted to be applied to tires for a thickening therefor.

In the use of wire coils in the manufacture of tires it has been common to apply india-rubber compound directly to the wire, and in my experiments, aiming to more thoroughly and securely incorporate the wire in the body of a tire, I may and have covered the wire from which the wire coils and strands are made with a non-metallic material which will preferably be composed of fibrous material $p^2$, wound around the wire $p$, constituting the core for the coils and the strands. The india-rubber will cling with greater tenacity to the fibrous covering than to the metallic surface of the wire.

Having fully described my invention, what I claim as new, and desire to secure by Letters Patent, is—

1. A flexible tire comprising a yielding body having an internal metal armor, combined with a series of edge coils embedded in that part of said body in contact with the rim of the wheel, and adapted to be extended about said rim in the direction of its length.

2. A flexible tire comprising a yielding body having an internal armor, and a series of intermeshed wire coils in that part of the body that contacts with the wheel-rim, and adapted to be extended about said rim.

3. A flexible tire comprising a body having hooked edges, a series of wire coils in said body and crossing the same, and other series of wire coils running longitudinally in said hooked edge.

4. A flexible tire having internal intermeshed wire coils crossing the tire, and a series of connected edge coils adapted to be extended about the rim in the direction of the length of the tire.

5. A flexible tire having internal intermeshed wire coils crossing the tire, and a series of connected edge coils adapted to be extended about the rim in the direction of the length of the tire, some of said series of edge coils entering the thickened portion of the edge of the tire that contacts with the rim.

6. In a tire, a body of india-rubber, a series of wire coils connected therein, and locking means extended therethrough composed of wire having a non-metallic covering and extended through said coils.

7. A flexible tire composed of wire having a non-metallic covering and a body of india-rubber in which said wire is embedded.

In testimony whereof I have signed my name to this specification in the presence of two subscribing witnesses.

ARTHUR S. ALLEN.

Witnesses:
GEO. W. GREGORY,
NORA H. COFFIN.